(12) United States Patent
Lontka et al.

(10) Patent No.: US 11,651,675 B2
(45) Date of Patent: May 16, 2023

(54) SAFETY DEVICE INSPECTION

(71) Applicant: Siemens Schweiz AG, Zurich (CH)

(72) Inventors: Karen D. Lontka, Randolph, NJ (US); Christoph Wienands, Portsmouth, NH (US)

(73) Assignee: Siemens Schweiz AG, Zurich (CH)

( * ) Notice: Subject to any disclaimer, the term of this patent is extended or adjusted under 35 U.S.C. 154(b) by 0 days.

(21) Appl. No.: 16/761,446

(22) PCT Filed: Feb. 2, 2018

(86) PCT No.: PCT/US2018/016543
§ 371 (c)(1),
(2) Date: May 4, 2020

(87) PCT Pub. No.: WO2019/152044
PCT Pub. Date: Aug. 8, 2019

(65) Prior Publication Data
US 2020/0394900 A1    Dec. 17, 2020

(51) Int. Cl.
*G08B 29/12* (2006.01)
*G06T 7/90* (2017.01)
*G06T 7/00* (2017.01)
*H04N 7/18* (2006.01)

(52) U.S. Cl.
CPC ............ *G08B 29/12* (2013.01); *G06T 7/0002* (2013.01); *G06T 7/90* (2017.01); *H04N 7/183* (2013.01); *G06T 2207/10024* (2013.01)

(58) Field of Classification Search
CPC ......... G08B 29/12; G06T 7/90; G06T 7/0002; G06T 2207/10024; H04N 7/183
USPC ............................................................ 348/125
See application file for complete search history.

(56) References Cited

U.S. PATENT DOCUMENTS

| | | | |
|---|---|---|---|
| 9,905,122 B2* | 2/2018 | Sloo | G08B 17/10 |
| 10,982,868 B2* | 4/2021 | Grabowski | F24F 11/30 |
| 2008/0084291 A1* | 4/2008 | Campion | G08B 29/145 340/514 |
| 2008/0224847 A1 | 9/2008 | Pepper | |
| 2014/0309549 A1* | 10/2014 | Selig | A61B 5/123 600/559 |
| 2014/0369549 A1* | 12/2014 | Liang | G06F 21/10 382/100 |
| 2016/0133485 A1* | 5/2016 | Benjamin | H01L 22/20 118/712 |

(Continued)

FOREIGN PATENT DOCUMENTS

| | | |
|---|---|---|
| CN | 101337536 A | 1/2009 |
| CN | 102721404 A | 10/2012 |

(Continued)

OTHER PUBLICATIONS

PCT Search Report dated Oct. 19, 2018, for PCT Application PCT/US2018/016543, 16 pages.

(Continued)

*Primary Examiner* — John W Miller
*Assistant Examiner* — Omer Khalid (57) ABSTRACT

A safety device tester that verifies the operation of a safety device by identifying the safety device, placing the safety device in a test mode, and recording the operation of the safety device, and then storing the recording data in the cloud.

26 Claims, 8 Drawing Sheets

(56) References Cited

U.S. PATENT DOCUMENTS

| | | | | |
|---|---|---|---|---|
| 2016/0142611 A1* | 5/2016 | Nuggehalli | ............ | G06T 7/0016 |
| | | | | 348/207.11 |
| 2016/0343241 A1* | 11/2016 | Rossi | ................... | G08B 29/126 |
| 2018/0151060 A1* | 5/2018 | Griffin | ................... | G06F 16/29 |

FOREIGN PATENT DOCUMENTS

| | | | |
|---|---|---|---|
| CN | 103505840 | 1/2014 | |
| CN | 103674223 | 3/2014 | |
| CN | 104076041 | 10/2014 | |
| CN | 106959076 A | 7/2017 | |
| EP | 2461299 A2 * | 6/2012 | ............. G08B 1/08 |
| EP | 2461299 A2 | 6/2012 | |
| EP | 2587462 | 5/2013 | |
| EP | 2587462 A1 | 5/2013 | |

OTHER PUBLICATIONS

CN Office Action for CN Application No. 201880088288.9, 10 pages.

* cited by examiner

SAFETY DEVICE INSPECTION

RELATED APPLICATION

This patent document claims priority under 35 U.S.C. § 119 and all other benefits from PCT Application No. PCT/US2018/016543 titled "Safety Device Inspection," filed Feb. 2, 2018, the content of which is hereby incorporated by reference to the extent permitted by law.

TECHNICAL FIELD

The present invention relates generally to building automation and alarm systems and more particularly to assessing a safety device's operational condition.

BACKGROUND

Most modern buildings and homes are required to have safety device such as smoke detectors, carbon monoxide detectors, fire detectors, and safety alarm devices. But, safety device and other alarms have finite life expectancy that can be shortened by the quality of their components and environment. In a single-family home, the home owner may choose to ignore the condition of their smoke detector or other alarms with minimal risk to others outside of their house. But in structures such as condos, townhomes, and apartment buildings, the failure of a smoke detector or alarm may have catastrophic consequences to the others who share the structure. Thus, periodically smoke detectors and alarms in all the units and spaces of a building must be inspected for proper operational conditions. Additionally, in certain jurisdictions laws exist that mandate such smoke detector inspections.

Traditional approaches for checking the safety device or alarms is to have people go to each alarm and test it. This is often invasive to tenants' privacy and prone to errors as proof at a later point in time that the test actually has occurred is often impossible. If a condominium association asks all unit owners to check their safety devices themselves, the association typically sends cards that must be returned stating the safety device was tested. A card may be returned, but no way exists to verify if any smoke detector had actually been tested.

In view of the foregoing, there is an ongoing need for systems, apparatuses and methods for evaluating and verifying the operational testing of safety devices and other alarms in a more efficient and reliable way.

SUMMARY

An approach is provided for testing safety devices and verifying the results of the test using smart devices connected to a network. The testing of a safety device or other alarm provides for identification of the alarm being tested, audio and video evidence of the test, and recording of the test data.

Other devices, apparatuses, systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
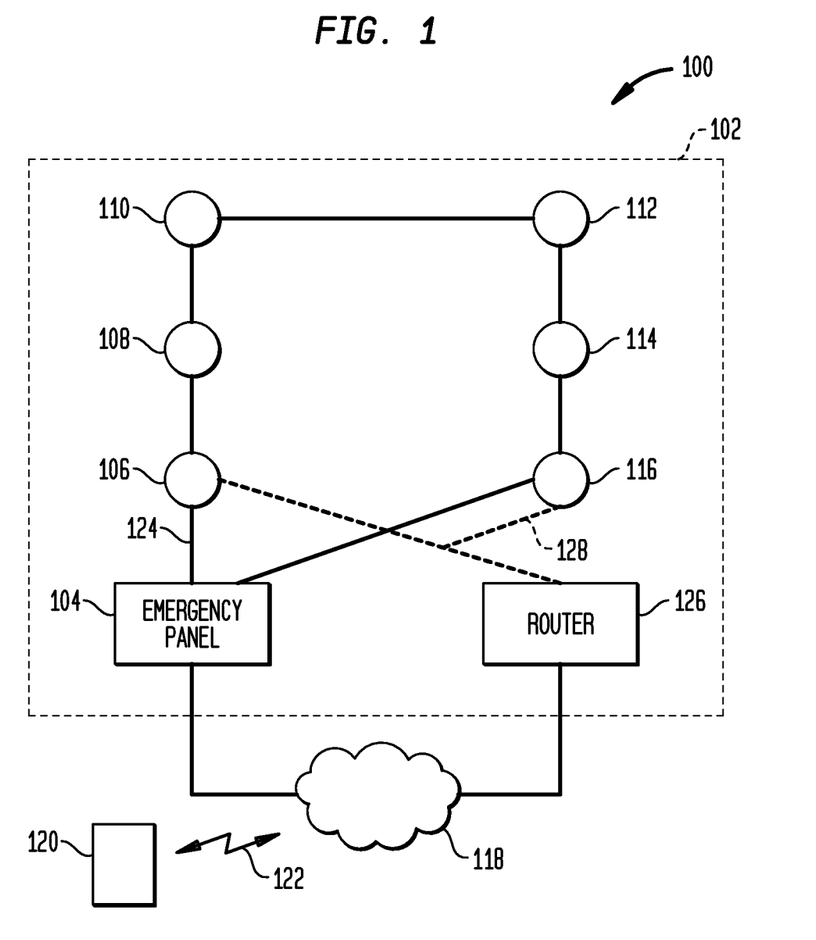
FIG. 1 is an illustration of a building with a plurality of safety devices (smoke detectors), either coupled to an emergency panel or coupled to a local network, in accordance with an example implementation of the invention.

Turning to FIG. 1, an illustration 100 of a building 102 with an emergency panel 104 coupled to a plurality of safety devices (such as smoke or fire detectors) 106-116 is depicted in accordance with an example implementation of the invention. The emergency panel 104 is also connected to the internet 118 (typically via a local network). In operation, a smoke detector, such as detector 106, detects heat and/or smoke. If heat or smoke is detected by smoke detector 106, it sounds an audible alarm and if equipped with a light, lights the light. Additionally, it sends a signal to other smoke detectors 106-116 and to the emergency panel 104 using a bus or wiring 124 dedicated for such alarms. The emergency panel 104 then indicates which alarm has been triggered. A smart device 120, such as a smart telephone or tablet may communicate 122 with the emergency panel 104 via the network 118 using wireless internet connections or 3G/4G cellular network connections.

In other implementations such as in a single-family home, an emergency panel 104 will not be present. Rather, the smoke detectors may be connected together (wired or wireless) and coupled to a router 126 and Internet 118 via a local area network 128 (which may be wired, wireless, or a combination of wired and wireless). The wireless device may communicate directly with the smoke detector, such as smoke detector 106 via the router 126 and local area network 128, or via the internet 118 using wireless internet connections or 3G/4G cellular network connections. Other examples of safety devices include fire detector, carbon monoxide detector, gas detector, etc. . . . )

Figure 2:
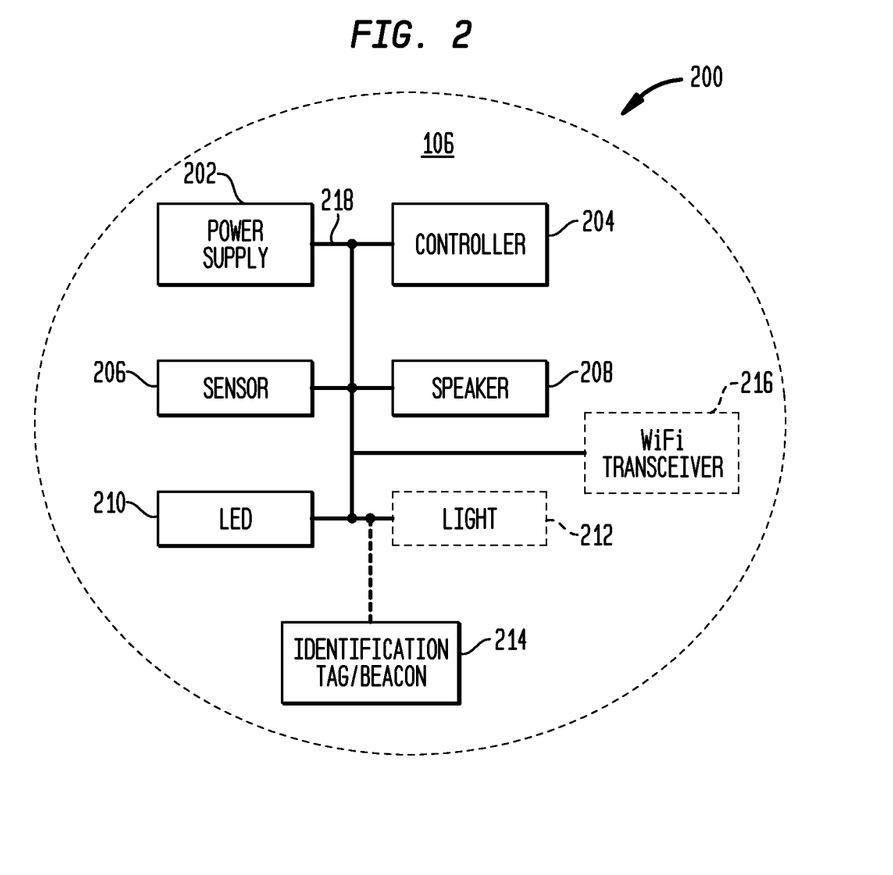
FIG. 2 is an illustration of a block diagram representation of a safety device (smoke detector) of FIG. 1 in accordance with an example implementation of the invention.

In FIG. 2, an illustration of a block diagram 200 representation of a safety device (such as smoke detector 106 of FIG. 1) is depicted in accordance with an example implementation of the invention. The smoke detector has a power supply 202 (battery, electric, or a combination of battery and electric) coupled to a controller 204, sensor 206, speaker 208, and light emitting diode (LED) 210 by a communication and power/data bus 218. The controller 204 may also be coupled to an emergency light 212 and a wireless internet transceiver (WiFi) 216. In some implementations powered identification tags (such as RFID tags) or beacons 214 may be employed, such that each smoke detector 106 has a unique identification tag or beacon. In yet other implementations, passive RFID tags may be employed or written codes such as bar codes, Q-codes, or text codes/writing may be visibly present on the smoke detector.

In operation, the sensor 206 of smoke detector 106 detects smoke and triggers an action by the controller, in some implementations the action may be the result of a processor interrupt. In other implementations, other types of safety devices may be used (such as fire detectors, heat detectors, carbon monoxide detector, to name but a few examples). The controller then activates the speaker 208 and light 212 to signal an emergency. If the smoke detector 106 is connected to an emergency panel (such as 104 of FIG. 1) the emergency panel also receives an alarm indication from the safety device 106. If the smoke detector is connected to other smoke detectors 106-116, these detectors receive an alarm indication also. If the smoke detector 106 has network capability (such as WiFi transceiver 216), the safety device 106 may send a notification over a local area network 126. In other implementations, notifications may be sent out over via wireless signaling, such as Bluetooth.

Figure 3:
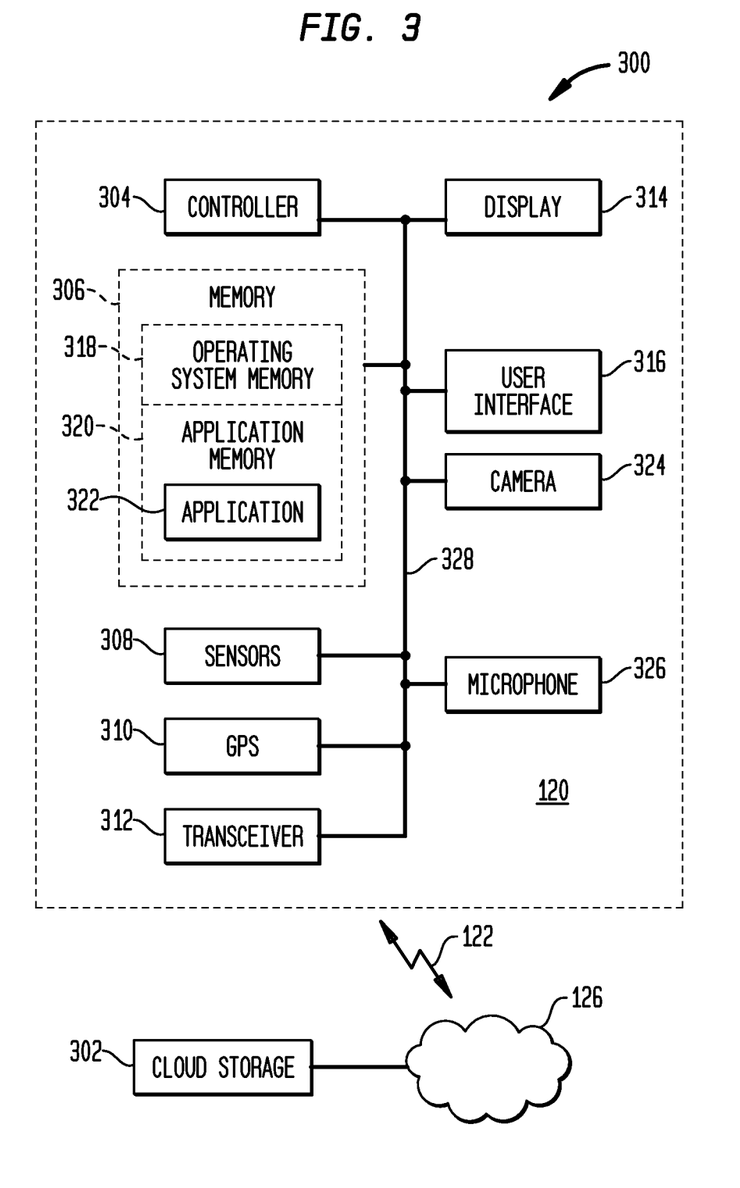
FIG. 3 is an illustration of a block diagram representation of a smart device as depicted in FIG. 1 in accordance with an example implementation of the invention.

Turning to FIG. 3, an illustration of a block diagram 300 representation of the smart device 120 of FIG. 1 in accordance with an example implementation of the invention. A controller 304 is coupled to a memory 306, sensors 308, geolocation (GPS) receiver 310, transceiver 312, display 314, user interface 316, camera 324, and microphone 326 by communication and power/data bus 328. The controller 304 executes a plurality of instructions stored in operating system memory 318 that operates the smart device 120. The instructions for the smoke detector verification application 322 are stored in application memory 322 and executed by controller 304. In response to the instructions, the user interface 316 accepts input from the user, display 314 displays instructions for verification of the smoke detector when the smoke detector verification application 322 is executed. Sensors 308 may include such sensors as, accelerometer, temperature, wind speed, altitude, air quality etc. . . . . GPS receiver 310 receives location data and may also determine speed, direction, and altitude along with changes in speed, direction and altitude. The transceiver 312 enables the smart device 120 to communicate 122 over the air via WiFi/Bluetooth/cellular (i.e. 3G/4G, GSM) with the internet 118 or local area network 128 and access the storage location (cloud storage 302) and/or external applications such as databases or record storage.

Figure 4:
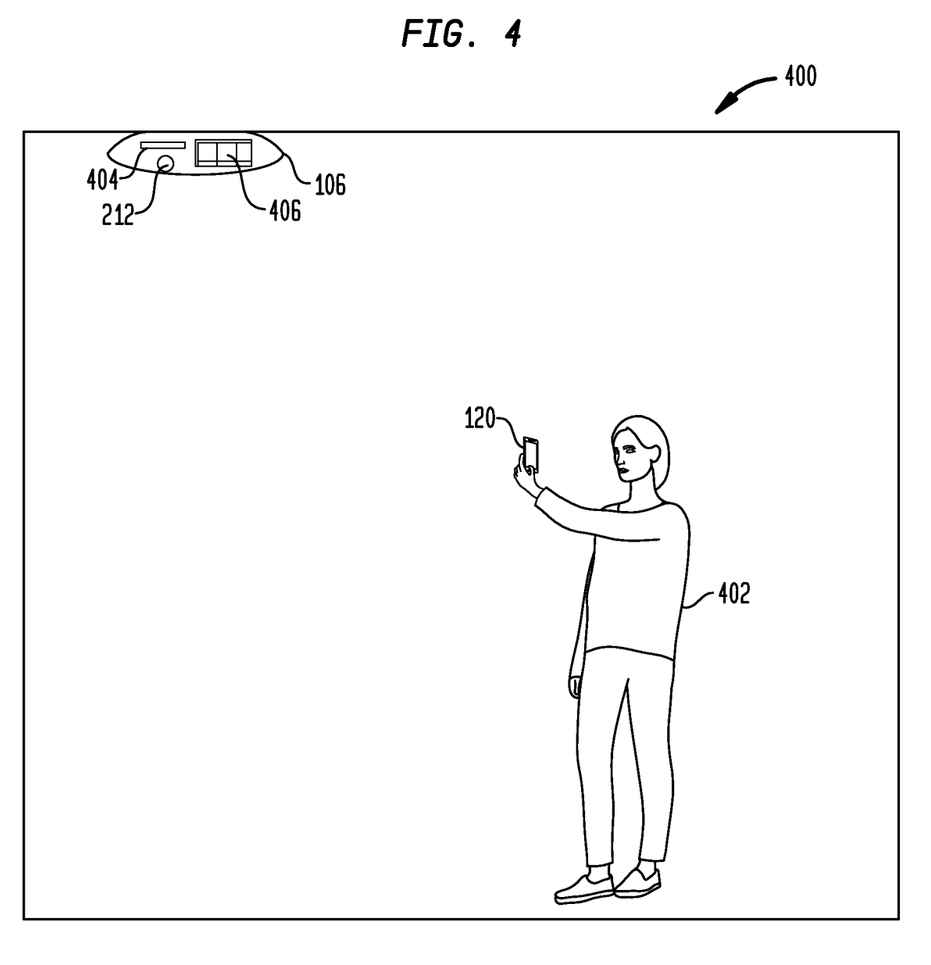
FIG. 4 is a diagram of the smoke detector and the smart device of FIG. 1 being used to verify operation of the smoke detector in accordance with an example implementation of the invention.

In FIG. 4, a diagram 400 of the smoke detector 106 and smart device 120 of FIG. 1 is shown being used to verify operation of the smoke detector 106 in accordance with an example implementation of the invention. A user 120 tests the operation of the smoke detector 106 by executing a safety device application 322 of FIG. 3 on a smart device 120. The user approaches a smoke detector and the application identifies the smoke detector automatically. The smoke detector 106 may detect the approaching smart device 120 using the GPS location of the smart device 120, signals from the smart device 120 (e.g. Bluetooth, light, audio, or similar short range signaling), or visible identification marks (e.g. tag or QR code). After the successful verification/inspection of a detector, the application 322 may inform the user via the smart device 120 of yet uninspected detectors and their location.

In other implementations, the user 402 may be instructed which smoke detector to verify by the safety device application 322 displaying an identification tag and/or the location of the smoke detector. A smoke detector identification tag 404 is viewable on the case or housing of the smoke detector and matches the displayed identification tag on smart device 120.

The smoke detector 106 is made to sound and the smart device 120 makes either a video recording or a combination of audio recording and images of the sounding of the smoke detector 106 and operation of light 212. The recorded information (data, video, audio, and/or image recordings) also includes the image of the smoke detector identification tag 404 if present. In other implementations if a vent screen (anti-dust screen) 406 is viewable over the sensor 206, an image of the vent is also made and an analysis is made of the digital image to determine if it is degraded or not, if there are obstructions too near, or if something is covering the device. All recorded information is transmitted from the smart device 120 for storage on the cloud 302 or in a network and the test is completed.

The smoke detector tester application may also have an input for receiving a distance measurement between the smoke detector 106 and smart device 120. In other implementations, a range finder may be a sensor in the smart device that determines the range or distance between the smart device 120 and smoke detector 106. In yet other implementations, mathematical methods may be employed to determine the distance between the smoke detector 106 and smart device 129 from a recorded video or image. The distance, once known, may be used to calibrate the audio recordings and/or determine the distances to visible obstructions. The distance may be used along with the microphone 326 to calculate the sound force of the alarm as part of the testing and/or determine the distance to possible obstructions seen in the digital image/video. This data may then be sent along with other recorded information to a predetermine location (cloud/server storage 302) for further processing and/or archiving.

Advantages of the described approach include that the verification of the smoke detector 106 operation is not only checked, but recorded. If a person is hired to make such verification, that person's work is verifiable. Furthermore, the application provides instructions to the user enabling unit owners to check smoke detectors and alarms themselves without having to let unknown persons into their dwellings.

Figure 5:
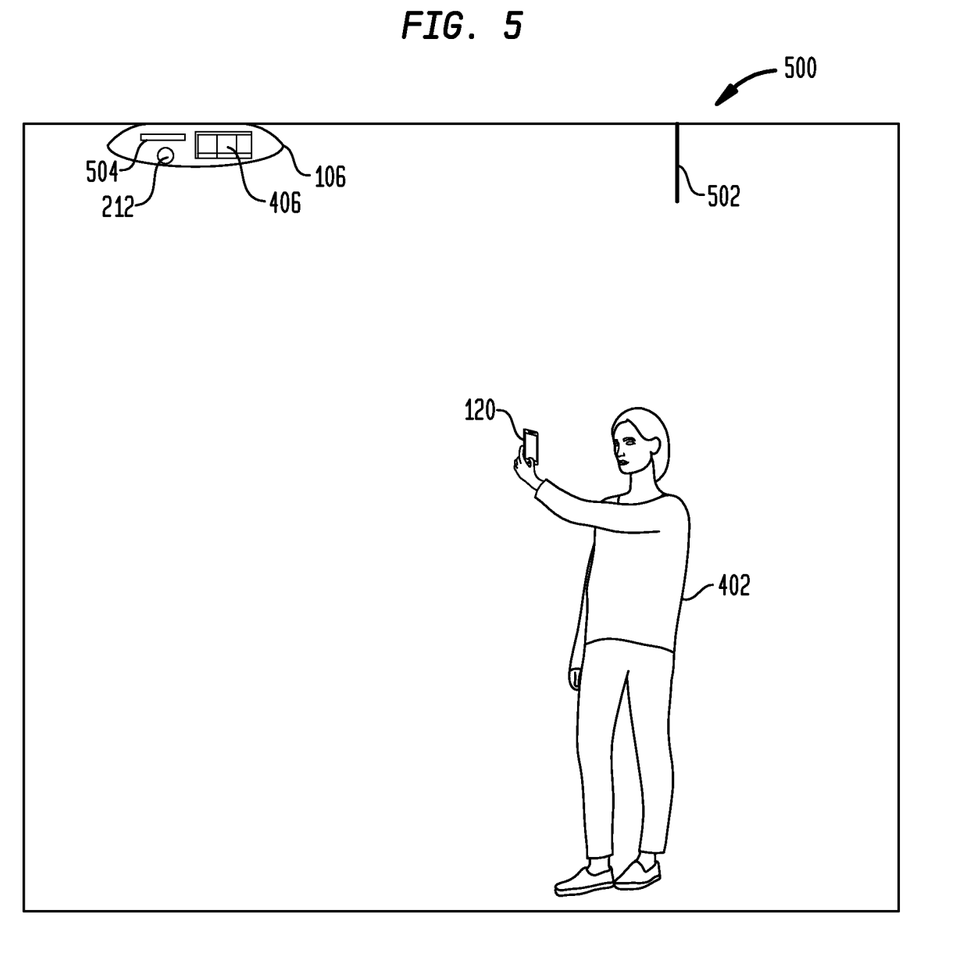
FIG. 5 is a diagram of the smoke detector and the smart device of FIG. 1 being used to verify operation of the smoke detector using a wireless network in accordance with an example implementation of the invention.

Turning to FIG. 5, a diagram 500 of the smoke detector 106 and smart device 120 of FIG. 1 being used to verify operation of the smoke detector 106 using a wireless network 502 is depicted in accordance with an example implementation of the invention. In this implementation, the user 402 approaches the smoke detector 106 to verify by the safety device application 322. As the smart device 120 is detected by the smoke detector, the safety device application 322 signals that the smart device 120 has been detected to the user. The smoke detector 106 may be instructed via the network 502 (502 being an WiFi access point in the current application) to provide an indication that it is in a testing mode, such as a flashing light 212, sound, flashing LED, powered up RFID identification tag 504 to give but a few examples. The user of the smart device 120 makes a video recording or a combination of audio recording images of the sound output of the smoke detector 106 and operation of light 212. The recording of the information may be controlled by the smoke detector verification application 322. The recorded information may also include the image of any additional external identification marks that may be present on the smoke detector 106. In other implementations if a vent screen 406 is viewable over the sensor 206, an image of the vent is also made and an analysis is made of the image (such as verification of color) to determine if it is degraded or not. All recorded information is transmitted from the smart device 120 for storage on the cloud 302 or in a network. External to the smart device 120, the images and videos may be combined with additional testing data generated by the smoke detector when the smoke detector's mode was changed to a test mode. Examples of such additional testing data includes date, time, unit information, battery condition, age of battery, age of smoke detector, and any internal events, alarms, or component failures, operational time, date and time of outages. In other implementations, the smart device 120 may receive the additional testing data directly from the smoke detector 106 and transmit it along with the other recorded information captured during testing/verification of the smoke detector 106.

The data may be further processed by the smart device or other computers to identify via the smoke detector verification application 322 operation status. If the smoke detector 106 has recorded internal events or battery condition requiring maintenance or replacement of the smoke detector 106, the user 402 is given an indication of such on the display of the smart device 120. If the user is a maintenance person, repairs may be made immediately and the fix/replacement recorded or otherwise indicated via the wireless device 120 to the cloud 302.

Figure 6:
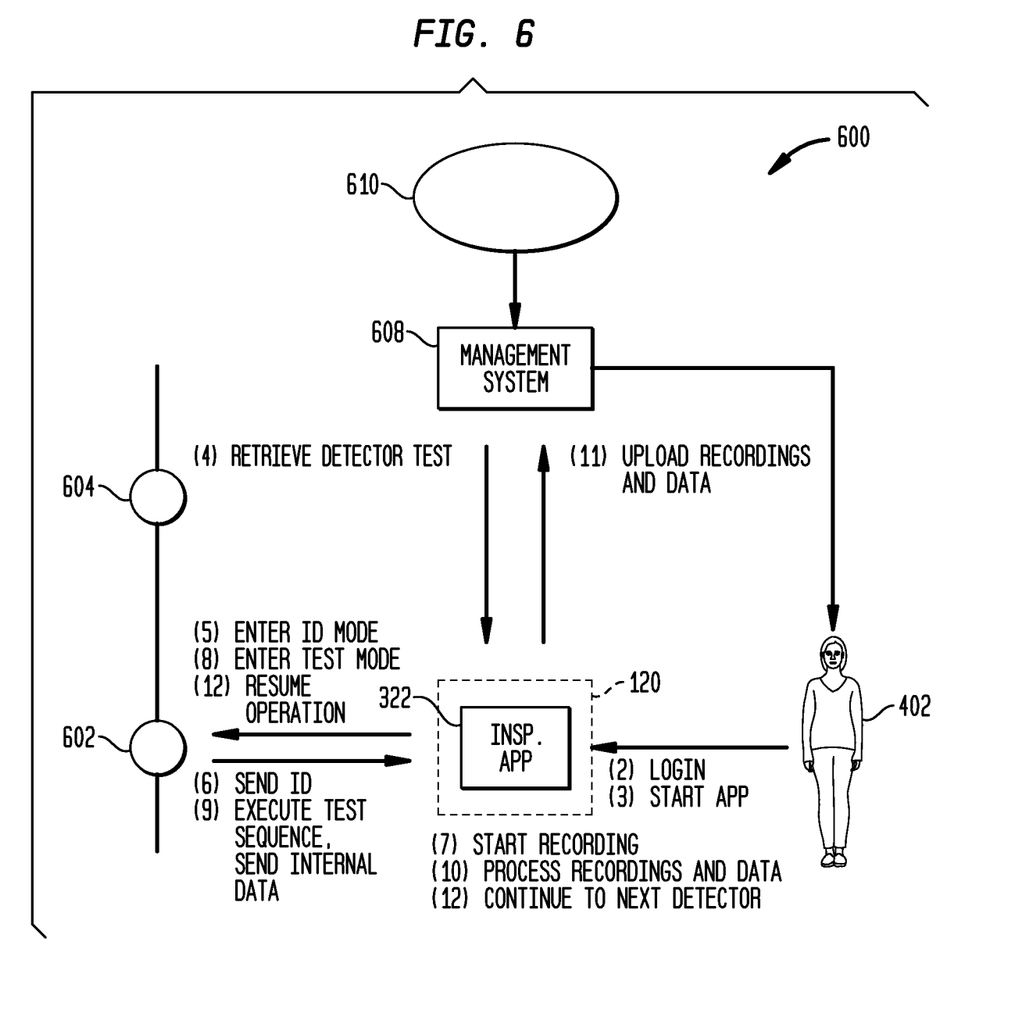
FIG. 6 is a diagram of the workflow of inspecting internet connected safety devices in accordance with an example implementation of the invention.

In FIG. 6, a diagram 600 of the workflow of inspecting internet 606 connected smoke detectors 602 and 604 is depicted in accordance with an example implementation of the invention. In the depicted workflow 600 the dwelling resident or inspector has the safety device application 322 installed on their smart device 120. The smart device 120 is also registered or associated (such as connected to the dwellings secure WiFi) to the dwelling being tested. The work-flow steps include the Internet-based management system 608 (which may be cloud based) determines that a scheduled inspection is due for the dwelling's smoke detectors and sends a reminder to the resident or person doing the test. This reminder can be sent via email, text message or synthetic voice message. The resident or user, then opens the safety device application 322 on smart device 120.

The application requests a login or other authentication by the user and displays the instructions for verifying the operation of a smoke detector on the smart device 120. Authentication may be with a text based password, biometric data (such as a fingerprint), fob having a magnetic or wireless code or tag, or other known approaches. Upon authentication of the user of the smart device, the safety device application 322 displays the number of detectors that need to be verified in the dwelling on the display 314 of the smart device 120.

The resident then begins the visual inspection for the first smoke detector 602. The safety device application 322 instructs the smoke detector 602 to enter an identification mode and shortly after the safety device application 322 is able to uniquely identify the smoke detector 602.

The safety device application 322 switches to snapshot mode to take a video recording or combination of audio recording and digital images of the smoke detector. The user of the smart device 120 centers the camera 324 on the detector until the detector is within the guidelines displayed on the smart device 120. In some implementations, the application may automatically zoom the camera to achieve the desired visual range.

The safety device application 322 instructs the detector to enter inspection mode, upon which the smoke detector 602 activates its built-in sounding mechanisms (e.g. piezo sounder, speaker). The safety device application 322 records using either an image of the detector plus an audio clip of the detector's audible inspection mode, or records a video that includes the properly centered detector and the detector's audible alarm.

The data collected by the safety device application 322 may then be uploaded to the Internet-based inspection service 608. The application may add a timestamp, user ID, device ID or an invisible/inaudible watermark to the recorded image/audio/video to prevent improper reuse of recorded data for future (non-)inspections. Additional smoke detector data may be received from the smoke detector at the smart device 120 and grouped or combined with the video/audio/image data already collected. The smart device 120 then transmits the data as well as other data like geo-location, the angle that the smart phone was held at, user ID, etc. to the inspection service 608. The cloud service 610 saves the received data along with time, date and operator ID to persistent storage to be used for future audit reports.

The safety device application 322 instructs/signals the detector to resume normal operation. In other implementations, a timeout may be used to automatically return the smoke detector 602 to normal operation. Upon completion for the verification of the smoke detector 602, the safety device application 322 informs the user via the smart device 120 of the successful inspection, decreases the number of detectors to be inspected and instructs the user/resident to inspect the next smoke detector 604.

When all smoke detectors have been tested or otherwise verified, the safety device application 322 finishes the process, thanks the user/resident and asks for confirmation that all actions were correct. The safety device application 322 then signals the cloud service to close and save the test data received from smart device 120.

Figure 7A:
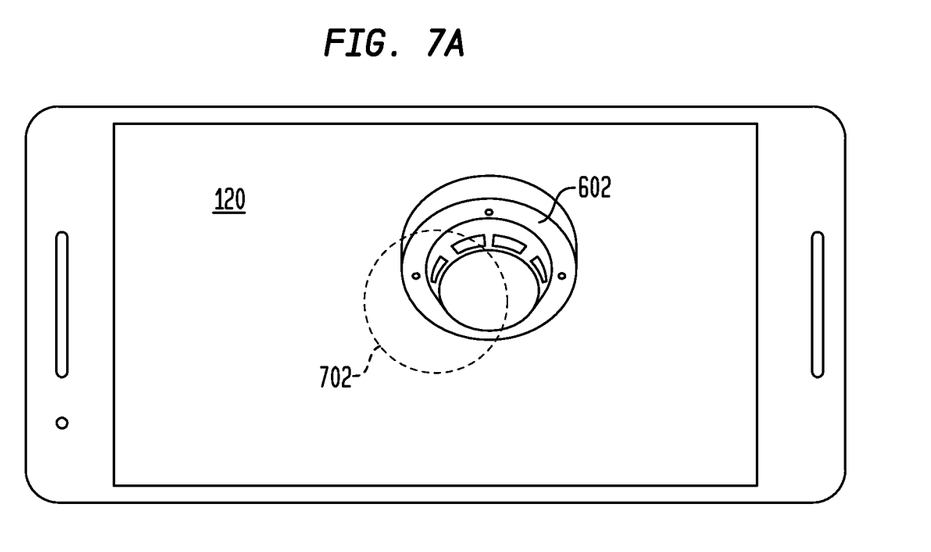
FIGS. 7a and 7b are diagrams of the smart device executing the safety device application showing proper positioning of the camera relative to the smart device in accordance with an example implementation of the invention.
Figure 7B:
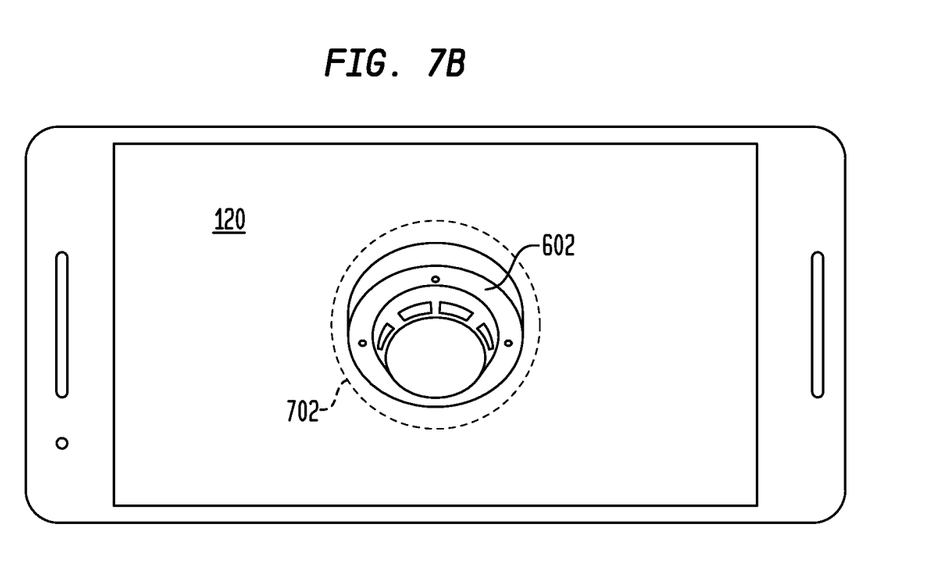

Turning to FIGS. 7a and 7b, diagrams of the smart device 120 executing the safety device application 322 showing the proper position of the camera 324 for recording video or digital images of the smoke detector 602 is depicted in accordance with an example implementation of the invention. The camera 324 of smart device 120 is pointed at the smoke detector 602. A visual indicator 702, such as a ring, is displayed showing where the smoke detector 602 needs to be centered and at which minimum distance the smart device 120 needs to be held. The ring 702 has an indication that the camera 324 is correctly centered, such as changing color from red to green as ring 702 does between FIGS. 7a and 7b.

Figure 8:
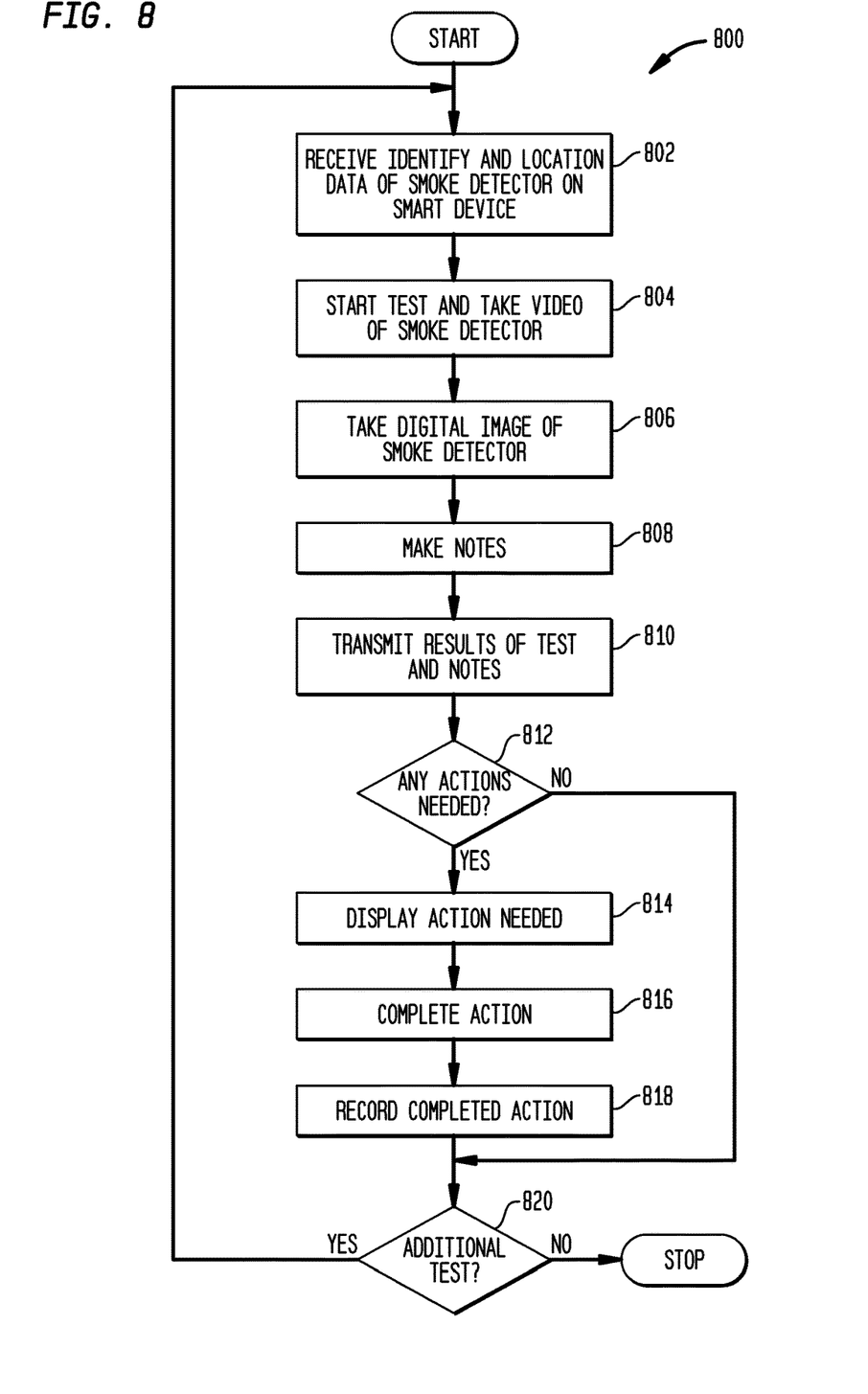
FIG. 8 is a flow diagram of the approach for verification of the smoke detector using the smart device of FIG. 1 in accordance with an example implementation of the invention.

In FIG. 8 is a flow diagram 800 of the approach for verification of the smoke detector 106 using the smart device 120 of FIG. 1 in accordance with an example implementation of the invention. The application 322 executed by smart device 120 receives identity and location data for a smoke detector 106 in step 802. The smoke detector 106 is tested and a video recording of the smoke detector 106 is made using the camera 324 and microphone 326 of smart device 120 in step 804. The testing may include capturing an image of the identification tag 404 of the smoke detector 106 and of any viewable vent or anti-dust screen 406 in step 806. In some implementations, the capturing of video may be in real time, where an acknowledgement is received at the smart device 120 in response to remote viewing of the real time image. The image of the viewable vent screens 406 may be processed to verify they are not clogged or otherwise blocked and the results sent back to the smart device 120. The user of the smart device 120 may also make notes that are associated with the digital image and video in step 808. In other implementations, a video or digital image may be a split screen video or digital image of the safety device and the user 402 taking the video or digital image may also be included. The digital image, video and notes are then transmitted by the smart device 120 for storage in a database or cloud/network location. The digital image, video and notes may be processed in step 812 and any needed actions sent to the smoke detector tester application 322 and displayed for the user to take action (clean screen/replace safety device 106, replace battery, etc.) in step 814. When the actions are completed in step 816, new video and digital images may be captured and sent to the cloud in step 818. If additional smoke detectors, such as smoke detectors 108-116 need to be checked in step 820, then the location of that new detector is displayed in step 802. If no additional actions are needed in step 812, then a check is made as to other smoke detectors needing to be checked in step 820. If no additional smoke detectors need to be check in step 820, processing is complete and the safety device application 322 is closed.

The alarm tester has been described as a smoke alarm tester, but in other implementations other types of alarms/motion detectors may be similarly tested. The smoke alarm tester may also be used by individuals in a home environment with the results stored locally on the smart device 120 or in yet other implementations sent to the manufacturer of the tested smoke detector. A tag located on the outside of the smoke detector may identify which smoke detector manufacturer to send the test results to.

In the current implementations, a smart device was used to test the smoke detector. In other implementations a dedicated device running a smoke detector tester application having a display, camera, microphone, and network capability may be employed.

In other implementations, the smart device may be employed with a beacon that signals to smoke detector that it should transition to a test mode and be tested using the above approach. In yet other implementations, the smart device may use a light/led (visible light or invisible light—Infra Red), Bluetooth, Bluetooth low energy, or WiFi to signal the smoke detector to transition to a test mode.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal) of the smoke detector tester application 322, and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer readable medium may selectively be, for example, but is not limited to, an electronic, magnetic, optical, electromagnetic, or semiconductor system, apparatus or device.

More specific examples, but nonetheless a non-exhaustive list, of tangible computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the tangible computer-readable medium may even be paper (punch cards or punch tape) or another suitable medium upon which the instructions may be electronically captured, then compiled, interpreted or otherwise processed in a suitable manner if necessary, and stored in a computer memory.

The foregoing detailed description of one or more embodiments of the approach for testing alarms and smoke detectors has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A system for testing a safety device, comprising:
a camera;
a microphone;
a transceiver; and
a controller that receives an indication from at least one of the camera, microphone, and transceiver that the controller is in proximity to the safety device, and the controller signals to the safety device to enter a test mode and captures information of the safety device in the test mode, after which the controller sends the captured information to a storage location, wherein the controller determines a distance between the camera and the safety device using at least the camera to calibrate the audio recordings.

2. The system for testing the safety device of claim 1, wherein a digital image is captured by the camera and is sent to the storage location with the captured information.

3. The system for testing the safety device of claim 2, where the digital image includes additional testing data from the safety device.

4. The system for testing the safety device of claim 2, where the digital image includes an image of a vent screen having a plurality of openings, and the controller processes at least a portion of the vent screen image corresponding to at least one of the opening to determine if the vent screen is at least partially blocked.

5. The system for testing the safety device of claim 2, where the digital image includes an image of a vent screen having a plurality of openings, the controller processes at least a portion of the vent screen image corresponding to at least one of the openings to determine a color of the vent screen disposed beneath the vent screen in the image, and the controller determining a condition of the vent screen based on the determined color, wherein the captured information includes the condition of the vent screen.

6. The system for testing the safety device of claim 1, includes a light in the safety device being illuminated when the safety device's identity is ready to be received by the controller.

7. The system for testing the safety device of claim 1, includes an audio signal generated by a speaker in the safety device when an identity of the safety device is ready to be received by the controller.

8. A method for testing a safety device, comprising the steps of:
receiving at a controller an indication from at least one of the camera, the microphone, and the transceiver that the controller is in proximity to the safety device,
signaling with the transceiver coupled to the controller that the safety device is to enter a test mode,
capturing information associated with the safety device in the test mode,
determining a distance between the camera and the safety device with the controller using at least the camera to calibrate the audio recordings, and
sending the captured information to a storage location.

9. The method for testing the safety device of claim 8, where the step of capturing information includes taking a digital image of the safety device in the test mode with the camera.

10. The method for testing the safety device of claim 9, where capturing the digital image further includes capturing the digital image having an image of an identification tag associated with safety device.

11. The method for testing the safety device of claim 9, where capturing the digital image further includes capturing an image of a vent screen having a plurality of openings, and processing with the controller at least a portion of the vent screen image corresponding to at least one of the opening to determine if the vent screen is at least partially blocked.

12. The method for testing the safety device of claim 9, where capturing the digital image further includes capturing an image of a vent screen having a plurality of openings, processing with the controller at least a portion of the vent screen image corresponding to at least one of the openings to determine a color of the vent screen disposed beneath the vent screen in the image, and determining the a condition of the vent screen by the controller based on the determined color, wherein the captured information includes the condition of the vent screen.

13. The method for testing the safety device of claim 8, includes receiving safety device data via the transceiver that is transmitted with the captured information.

14. The method for testing the safety device of claim 8, includes receiving safety device data via a sensor, where the safety device data is transmitted with the captured information by the transceiver.

15. A non-transient computer readable media containing a plurality of instructions that when executed execute a method for testing a safety device, the instructions comprising the steps of:
receiving at a controller an indication from at least one of the camera, the microphone, and the transceiver that the controller is in proximity to the safety device,
signaling with the transceiver coupled to the controller that the safety device is to enter a test mode,
capturing information associated with the safety device in the test mode,
determining a distance between the camera and the safety device with the controller using at least the camera to calibrate the audio recordings, and
sending the captured information to a storage location.

16. The non-transient computer readable media of claim 15, includes instructions for the step of capturing information includes capturing a digital image of the safety device in the test mode by the camera.

17. The non-transient computer readable media of claim 16 where the instructions for the step of capturing the digital image further includes, capturing the digital image having an image of an identification tag associated with safety device.

18. The non-transient computer readable media of claim 16 where the instructions for the step of capturing the digital image further includes, capturing an image of a vent screen having a plurality of openings, and processing with the controller at least a portion of the vent screen image corresponding to at least one of the opening to determine if the vent screen is at least partially blocked.

19. The non-transient computer readable media of claim 16 where the instructions for the step of capturing the digital image further includes, capturing an image of a vent screen having a plurality of openings, processing with the controller at least a portion of the vent screen image corresponding to at least one of the openings to determine a color of the vent screen disposed beneath the vent screen in the image, and determining the a condition of the vent screen by the controller based on the determined color, wherein the captured information includes the condition of the vent screen.

20. The non-transient computer readable media of claim 16, includes instructions for the step of receiving via the transceiver safety device data and sending the safety device data with captured information to the storage location.

21. The system for testing the safety device of claim 1, wherein the controller adds security data to the captured information to prevent improper use or reuse of the captured information.

22. The system for testing the safety device of claim 1, wherein the controller calibrates audio recordings of the captured information based on the distance between the camera and the safety device.

23. The method for testing the safety device of claim 8, wherein sending the captured information to a storage location includes adding security data to the captured information to prevent improper use or reuse of the captured information.

24. The method for testing the safety device of claim 8, further comprising calibrating audio recordings of the captured information based on the distance between the camera and the safety device.

25. The non-transient computer readable media of claim 15, wherein sending the captured information to a storage location includes adding security data to the captured information to prevent improper use or reuse of the captured information.

26. The non-transient computer readable media of claim 15, further comprising calibrating audio recordings of the captured information based on the distance between the camera and the safety device.

* * * * *